April 1, 1958 J. MOYES 2,829,003
REAR WINDOW VISOR
Filed April 5, 1956 2 Sheets-Sheet 1
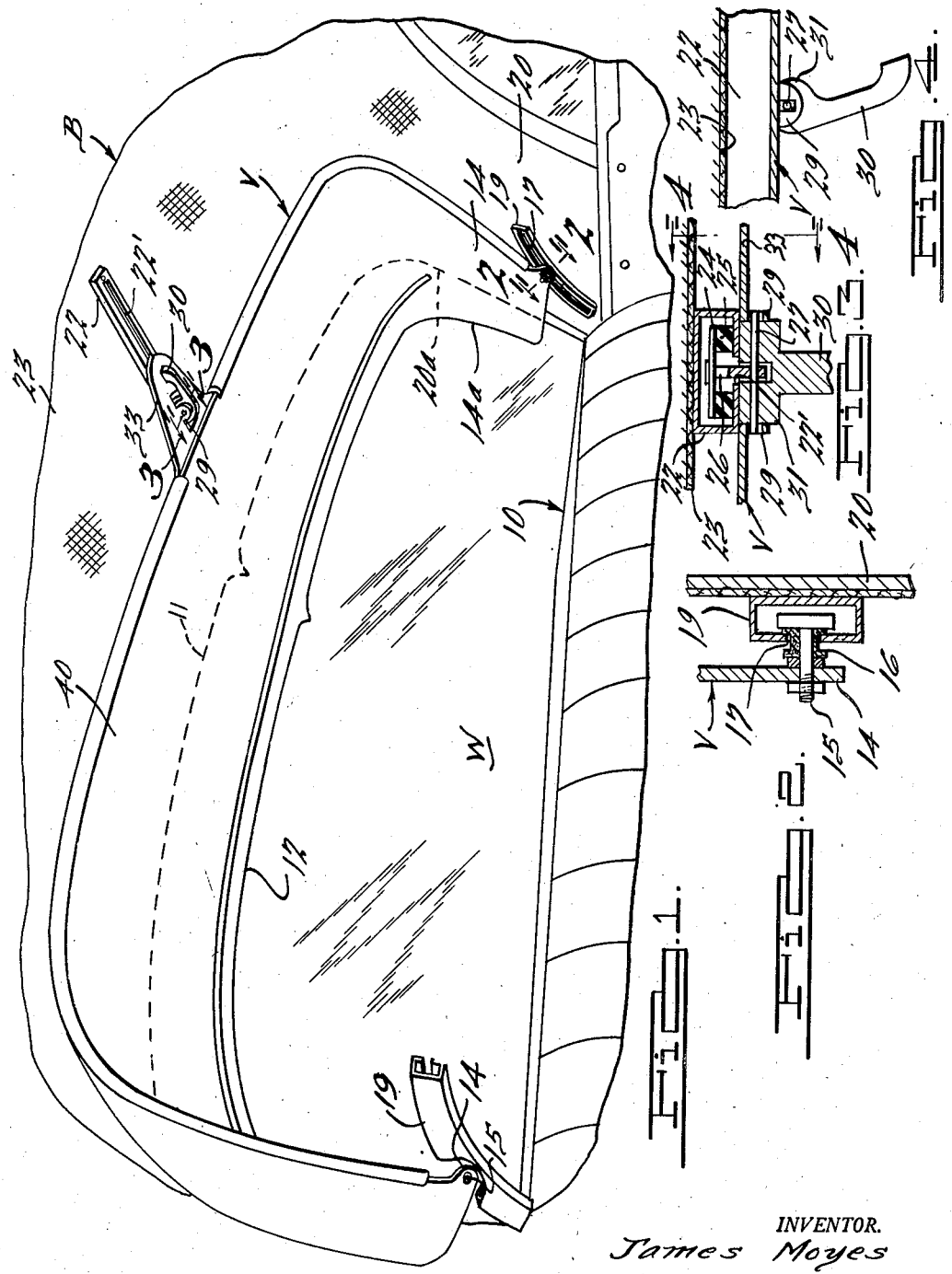
INVENTOR.
James Moyes
BY
Harness and Harris
ATTORNEYS

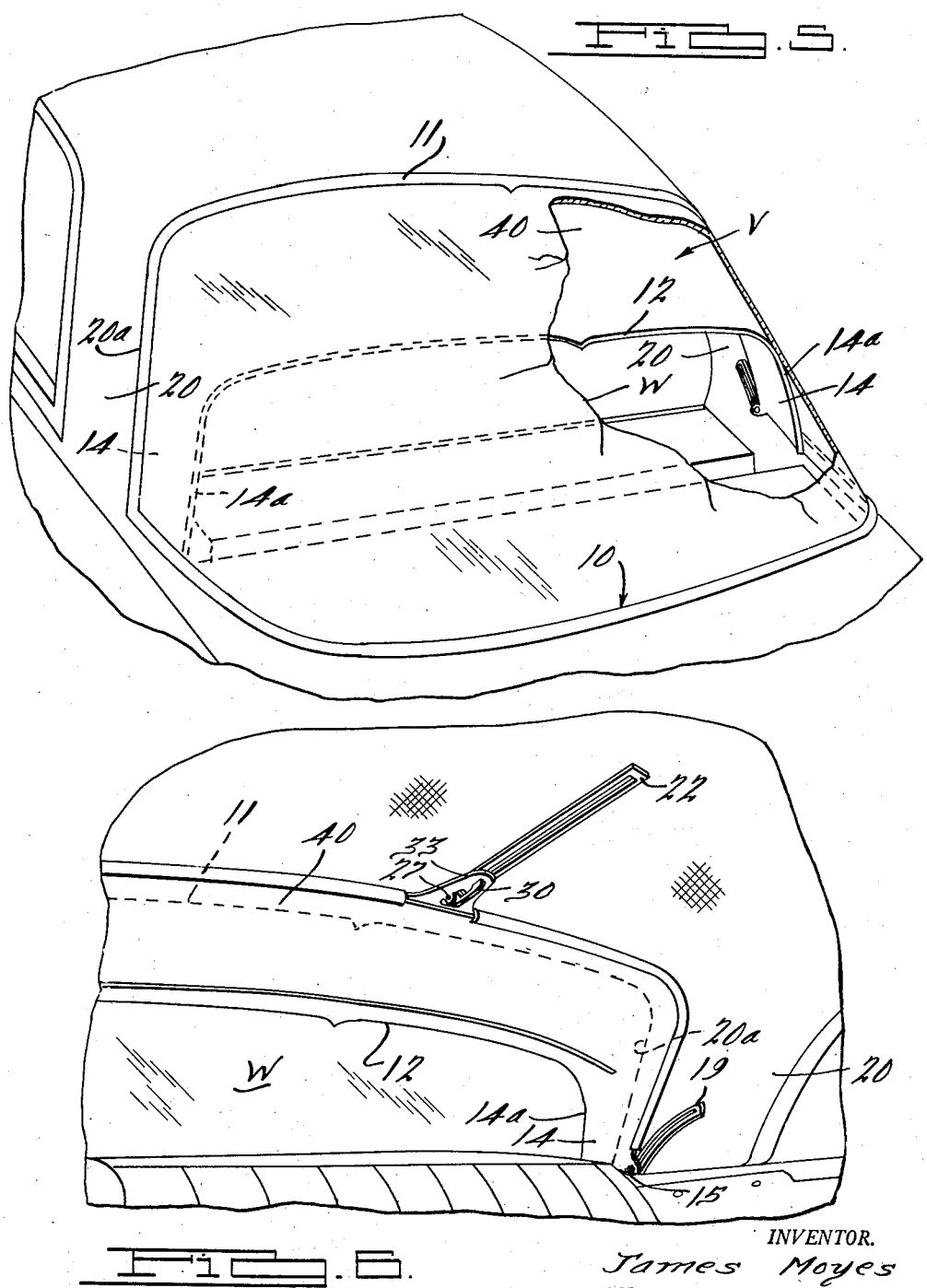

United States Patent Office 2,829,003
Patented Apr. 1, 1958

2,829,003
REAR WINDOW VISOR

James Moyes, Pleasant Ridge, Mich., assignor to Chrysler Corporation, Highland Park, Mich., a corporation of Delaware Application April 5, 1956, Serial No. 576,265

2 Claims. (Cl. 296—97)

This invention relates to an adjustable, interiorly mounted, window visor for motor vehicles or the like.

It is a prime object of this invention to provide an adjustably mounted vehicle window visor that is readily shiftable between a position when it is substantially concealed adjacent the interior side of the roof of the vehicle to a plurality of other positions where it blocks off heat and light transmission through portions of the associated window.

It is another object of this invention to provide an adjustable vehicle window visor that is designed and arranged such that it complements both the interior and exterior styling of the associated vehicle.

It is a further object of this invention to provide an adjustable, interiorly arranged, vehicle window visor that is readily shiftable between a plurality of different positions covering various portions of the associated window and wherein the design and mounting of the visor permits it to appear to be an integral portion of the vehicle body adjacent the window.

It is another object of this invention to provide a three point mounting for an adjustably supported, interiorly mounted, window visor that is simple, readily attachable to the interior of the vehicle roof, and arranged so that it causes the associated visor to conform to the shape of the vehicle roof in any of its various adjusted positions.

It is a further object of this invention to provide an adjustable window visor for a vehicle that can be readily shifted and locked in any one of a number of positions where it either uncovers the entire associated window or covers various portions thereof.

It is a further object of this invention to provide a window visor unit that may be readily installed as an accessory package or as original equipment and in either case gives the appearance of being an integral part of the supporting structure.

Other objects and advantages of this invention will be readily apparent from a reading of the following description and a consideration of the related drawings wherein:

Fig. 1 is a fragmentary perspective view of the interior of the rear roof portion of a motor vehicle body that embodies this invention;

Fig. 2 is a sectional elevational view taken on the line 2—2 of Fig. 1;

Fig. 3 is a sectional elevational view taken along the line 3—3 of Fig. 1;

Fig. 4 is a side elevational view taken in the direction of the arrow 4 of Fig. 3;

Fig. 5 is a fragmentary perspective view of the exterior of the rear roof portion of the motor vehicle body shown in Fig. 1, certain portions being broken away and shown in section; and Fig. 6 is a fragmentary perspective view similar to Fig. 1 but showing the adjustable visor in its lowermost position.

With the increase in glass area in the upper portions of vehicle bodies, particularly in the front and rear window areas where compound curvature glass panels are used, a problem has developed with regard to the control of heat and light transmission to the body interior adjacent the front and rear windows. While increased vision, as a result of the increased window glass area, is an advantage, still, it causes some problems in that at certain times of the day or night the large window glass area may admit so much heat and/or light that it may be uncomfortable or objectionable to the vehicle occupants. This invention provides a means whereby the heat and/or light transmission through the large window areas may be readily controlled. Furthermore, this invention provides a visor construction that it is easy to adjust and one that is arranged such that it complements the body styling to such a degree that it appears to be an integral permanent part of the body structure in any of its various adjusted positions. In addition, the visor is so designed that it may be readily installed at any time as an accessory package or be originally incorporated in the vehicle body as an integral part of the vehicle.

Fig. 1 shows the rear upper portion of the interior of a vehicle body B that has a relatively large rear window opening 10 that receives a transparent panel W of compound curvature. The window W is shaped so that it will form a smooth continuous portion of the body B. The upper edge 11 of the window opening 10, which may be shaped to provide a body styling characteristic, may be concealed from the car interior by the shiftable, readily adjustable, visor V whenever the visor V is lowered from its uppermost retracted position. Visor V is preferably made from some semi-rigid, opaque material that can be shaped by molding or the like to exactly conform to the shape of the body roof adjacent the rear window. This visor V would preferably be of some material that will not transmit heat or light and it could have its exposed underside or face covered with a material that is similar to or complements the body roof liner material used in the vehicle. The upper side or face of the visor V should be covered with a material like the body outer surface or a complementary trim material. Because of the shape and the manner of mounting the shiftable visor V on the car roof interior surface, the visor V can be used as an interior decorative trim element. It may be that certain opaque or translucent plastic materials will be found to be quite satisfactory as materials from which the visor V can be fabricated.

The lower edge 12 of the visor V is shaped to exactly conform to the shape of the lower edge 11 of the window opening 10. With this arrangement, when the visor V is in its uppermost retracted position, the edges 11, 12 will coincide. Also, as the visor V is lowered to an intermediate position, as shown in Fig. 1, or to its lowermost position, as shown in Figs. 5 and 6, the styling appearance of the rear window opening 10 of the vehicle body B will not be destroyed because the visor lower edge 12 will continuously present an upper edge for the apparent window opening that is identical to the upper edge 11 of the actual body window opening 10.

As can be readily observed from Figs. 1, 5 and 6, the visor V is movably mounted on the interior side of the body roof so that it can be shifted longitudinally of the car body. Fixed in each side lower edge 14 of the visor V is a bolt type pivot shaft or pin 15. Shaft 15 rotatably supports a sleeve or thimble-type roller 16. Rollers 16 are arranged to be slidably mounted in slots 17 formed in channel-type guideways 19 that are detachably mounted on each of the roof rear quarter sections or roof rails 20.

A slotted, channel-type guideway 22 is fixed to the vehicle roof 23, preferably along the longitudinal centerline thereof. There is mounted within the channel 22 a T-shaped plunger 24 that has resilient pads 25 mounted on the underside of its head portion. The stem portion 26 of the T-shaped plunger 24 extends through the slot 22' in the channel-type guideway 22. The free lower end of the plunger stem 26 carries a pivot pin 27. The opposite ends of the pivot pin 27 are pivotally mounted in a pair of spaced, slotted ears 29 carried by the plate 33 mounted on the visor V. Pivotally mounted on the pivot pin 27, between the plate carried ears 29, is a handle 20 having cam portions 31 that are engageable with the lower exposed side of the channel guideway 22. When the handle 30 is in the vertical position shown in Fig. 4 then the visor V may be easily shifted forwardly or rearwardly to the desired position after which it may be locked in the selected position by merely rotating the handle forwardly and upwardly about the pivot pin 27. From the foregoing it will be obvious that the handle 30 is folded in flush against the visor plate 33 (see Figs. 1 and 6) at all times except when the visor is being shifted to a different position. When the handle 30 is pulled down to a vertical position to release the cam lock 31 then the handle 30 provides suitable leverage for facilitating shift of the visor V.

From the foregoing description and a consideration of Figs. 1, 5 and 6 it will be noted that the visor V is relatively inconspicuous even though it may have been added to the car interior as an accessory either during or after building of the vehicle. Furthermore, when the visor V is in its fully retracted position it is not visible from the exterior of the car through the rear window W because the main body portion 40 of the visor is flush against and concealed beneath the interior side of the body roof portion and the leg portions 14 of the visor V are concealed behind the roof rails 20. As the visor V is moved to its lowermost position, shown in Fig. 6, not only does the visor lower edge 12, which is similar in shape to the window opening edge 11, provide a corresponding outline for the top edge of the window opening 10, but in addition the side edges 14a of the visor V are moved outwardly into the window area to restrict the width of the apparent window opening and still maintain the same general window opening contour as that visible when the visor V is completely retracted. This results from the specific shape of the visor V as well as its type of three point floating mounting. This particular mounting also eliminates noise because the rubber pads 25 support the mid-portion of the visor V on the roof mounted guideway 22 while the visor end portion supporting bearing sleeves 16, which are of nylon or some similar sound deadening material, support the end portions 14 of the visor on the body roof rails 20. Each of the above features cooperate to provide a visor that is an all around improvement over the prior art.

I claim:

1. In combination with a vehicle body having an opening therein closed by a transparent panel of compound curvature that forms a smooth continuous portion of the body surface, a light modifying visor comprising a main body portion with depending side portions movably mounted on the interior side of the body surface adjacent the panel opening and shaped to conform to the interior surface of the body adjacent the panel opening, said visor being arranged to be shifted from a retracted position where it does not obstruct vision through the transparent panel to various extended positions modifying vision through portions of said panel, means movably mounting said visor on the interior of said vehicle body comprising a plurality of guideways connected between the visor and body interior including guideways at the side portions of the visor and a guideway located centrally of the main body portion of the visor, and a locking means associated with the centrally located one of said guideways to provide for anchoring said visor in any of its extended or retracted positions, said visor having the main body portion and the depending side portions each shaped and arranged for guided movement into and out of said panel opening during shifting movement of the visor longitudinally of the vehicle body whereby the original outline of the panel opening can be maintained even though the effective transparent area of said panel is variable by extension of the visor into the panel opening area.

2. In combination with a vehicle body having an opening therein closed by a transparent panel of compound curvature that forms a smooth continuous portion of the body surface, a light modifying visor movably mounted on the interior side of the body surface adjacent the panel opening and shaped to conform to the interior surface of the body adjacent the panel opening, said visor being arranged to be shifted from a retracted position where it does not obstruct vision through the transparent panel to various extended positions modifying vision through portions of said panel, means movably mounting said visor on the interior of said vehicle body comprising a plurality of guideways connected between the visor and body interior, and a locking means associated with one of said guideways to provide for anchoring said visor in any of its extended or retracted positions, said visor having a main body portion with an edge arranged to conform to the shape of the top edge of the panel opening and side portions have edges shaped to conform to the side edges of the panel opening, said main body portion of the visor mounting the locking means associated with said one guideway and the visor side portions each mounting roller means engageable with other guideways on the body interior to provide for guided movement of the visor main body and side portions into and out of the panel opening whereby the original outline of the panel opening can be maintained even though the effective transparent area of said panel is variable by extension of the visor into the panel opening area.

References Cited in the file of this patent

UNITED STATES PATENTS

| D. 175,324 | Sullivan | Aug. 9, 1955 |
| 1,810,422 | Hall | June 6, 1931 |
| 1,989,592 | Ghazal | Jan. 29, 1935 |
| 2,102,454 | Bennett | Dec. 14, 1937 |
| 2,697,004 | Hovis | Dec. 14, 1954 |
| 2,747,923 | McLean | May 29, 1956 |